United States Patent
Hirt et al.

(10) Patent No.: US 10,642,720 B2
(45) Date of Patent: May 5, 2020

(54) TEST CASE GENERATOR BUILT INTO DATA-INTEGRATION WORKFLOW EDITOR

(71) Applicant: TALEND, INC., Redwood City, CA (US)

(72) Inventors: Michaël Guillaume Maurice Hirt, Montigny-le-Bretonneux (FR); Ciaran Dynes, Wicklow (IE)

(73) Assignee: TALEND, INC., Redwood City, CA (US)

(*) Notice: Subject to any disclaimer, the term of this patent is extended or adjusted under 35 U.S.C. 154(b) by 0 days.

(21) Appl. No.: 15/386,930

(22) Filed: Dec. 21, 2016

(65) Prior Publication Data

US 2018/0074944 A1     Mar. 15, 2018

Related U.S. Application Data

(60) Provisional application No. 62/395,179, filed on Sep. 15, 2016, provisional application No. 62/402,880, filed on Sep. 30, 2016.

(51) Int. Cl.
*G06F 9/44* (2018.01)
*G06F 9/45* (2006.01)
(Continued)

(52) U.S. Cl.
CPC ...... *G06F 11/3684* (2013.01); *G06F 3/04817* (2013.01); *G06F 8/34* (2013.01); *G06F 11/3664* (2013.01)

(58) Field of Classification Search
CPC .... G06F 11/3684; G06F 3/04817; G06F 8/34; G06F 11/3664
See application file for complete search history.

(56) References Cited

U.S. PATENT DOCUMENTS

| | | | | |
|---|---|---|---|---|
| 7,370,296 | B2 * | 5/2008 | Koyfman | G06F 11/2257 714/E11.157 |
| 8,397,217 | B2 * | 3/2013 | Goryachev | G06F 11/3668 714/38.1 |

(Continued)

OTHER PUBLICATIONS

A.Z. Javed, Automated Generation of Test Cases Using Model-Driven Architecture, 2007, pp. 1-7. http://citeseerx.ist.psu.edu/viewdoc/download?doi=10.1.1.660.1440&rep=rep1&type=pdf (Year: 2007).*

(Continued)

*Primary Examiner* — Mongbao Nguyen
(74) *Attorney, Agent, or Firm* — Patterson + Sheridan, LLP

(57) ABSTRACT

Embodiments presented herein provide techniques for generating test cases for transformation modules that are part of a larger data-integration workflow for an extract, transfer, and load (ETL) project. A test case generated according to the present disclosure can be executed independently of the application that generated it and independently of data sources and destinations referenced in the data-integration workflow. To achieve this independence, the test case can include code that simulates data sources and destinations that interact with the transformation module in the data-integration workflow. Furthermore, the test case can be a unit test based on a unit testing framework and can be compatible with a selected software framework.

17 Claims, 6 Drawing Sheets

(51) Int. Cl.
  *G06F 9/445* (2018.01)
  *G06F 11/36* (2006.01)
  *G06F 8/34* (2018.01)
  *G06F 3/0481* (2013.01)

(56) References Cited

U.S. PATENT DOCUMENTS

| | | | | |
|---|---|---|---|---|
| 8,826,084 | B1* | 9/2014 | Gauf | G06F 11/3688 |
| | | | | 714/32 |
| 9,298,596 | B2* | 3/2016 | Caufield | G06F 11/3684 |
| 9,626,416 | B2* | 4/2017 | Li | G06F 17/30563 |
| 9,767,008 | B2* | 9/2017 | Harden | G06F 11/3684 |
| 2007/0033443 | A1 | 2/2007 | Tillmann et al. | |
| 2011/0088011 | A1* | 4/2011 | Ouali | G06F 8/10 |
| | | | | 717/105 |
| 2012/0192153 | A1* | 7/2012 | Venkatraman | G06F 11/3664 |
| | | | | 717/124 |
| 2012/0290527 | A1* | 11/2012 | Yalamanchilli | G06F 16/283 |
| | | | | 707/602 |
| 2013/0086558 | A1* | 4/2013 | Merino | G06F 11/3688 |
| | | | | 717/128 |
| 2014/0081902 | A1* | 3/2014 | Greenwood | G06F 11/368 |
| | | | | 707/602 |
| 2014/0095931 | A1* | 4/2014 | Sadasivam | G06F 11/3664 |
| | | | | 714/28 |
| 2014/0101640 | A1* | 4/2014 | Romdhane | G06F 11/3684 |
| | | | | 717/125 |
| 2014/0165043 | A1 | 6/2014 | Pasala et al. | |
| 2014/0344625 | A1* | 11/2014 | Thatte | G06F 17/30 |
| | | | | 714/38.1 |
| 2014/0344778 | A1* | 11/2014 | Lau | G06F 8/35 |
| | | | | 717/106 |
| 2015/0020049 | A1* | 1/2015 | Caufield | G06F 11/3684 |
| | | | | 717/124 |
| 2015/0095895 | A1* | 4/2015 | Taneja | G06F 11/3684 |
| | | | | 717/132 |
| 2015/0227452 | A1* | 8/2015 | Raghavan | G06F 11/3684 |
| | | | | 717/124 |
| 2015/0254171 | A1* | 9/2015 | Harden | G06F 11/3684 |
| | | | | 717/124 |
| 2015/0261824 | A1* | 9/2015 | Jha | G06F 16/24564 |
| | | | | 707/690 |
| 2015/0278393 | A1* | 10/2015 | Das | G06F 17/30557 |
| | | | | 707/601 |
| 2015/0347261 | A1* | 12/2015 | Li | G06F 11/3409 |
| | | | | 707/602 |
| 2016/0070641 | A1* | 3/2016 | Printz | G06F 11/3692 |
| | | | | 717/124 |
| 2016/0162398 | A1* | 6/2016 | Shabazz | G06F 11/3414 |
| | | | | 714/38.1 |
| 2016/0170846 | A1* | 6/2016 | Hands | G06F 11/1662 |
| | | | | 714/6.3 |
| 2016/0170864 | A1* | 6/2016 | Li | G06F 11/3684 |
| | | | | 717/126 |
| 2016/0328316 | A1* | 11/2016 | Balsavias | G06F 11/3684 |
| 2017/0060969 | A1* | 3/2017 | Dhayapule | G06F 17/30563 |
| 2017/0337121 | A9* | 11/2017 | Singi | G06F 11/3684 |

OTHER PUBLICATIONS

Marco A. Wehrmeister, Automatic Execution of Test Cases on UML Models of Embedded Systems, 2013, pp. 1-10. https://link.springer.com/content/pdf/10.1007%2F978-3-642-38853-8_4.pdf (Year: 2013).*

Wenquan Wang, Test Cases Generation for Model Transformations from Structural Information, 2013, pp. 1-10. http://ceur-ws.org/Vol-1104/5.pdf (Year: 2013).*

Rami Baddour, SCV2: A Model-based Validation and Verification approach to System-of-Systems Engineering, 2015, pp. 1-6. https://ieeexplore.ieee.org/stamp/stammp.jsp?tp=&arnumber=7151960 (Year: 2015).*

Dessislava Petrova-Antonova, TASSA: Testing Framework for web service orchestrations, 2015, p. 8-12. https://ieeexplore.ieee.org/stamp/stamp.jsp?tp=&arnumber=7166258 (Year: 2015).*

Hitham Haidar Deyab, Orchestration Framework for Automated Ajax-Based Web Application Testing, 2015, pp. 1-6. https://ieeexplore.ieee.org/stamp/stamp.jsp?tp=&arnumber=7475186 (Year: 2015).*

Vera Stoyanova, Automation of Test Case Generation and Execution for Testing Web Service Orchestrations, 2013, pp. 1-6. https://ieeexplore.ieee.org/stamp/stamp.jsp?tp=&arnumber=6525531 (Year: 2013).*

Pete Hodgson, "Working with Indirect Input and Output in Unit Tests—Being Agile," Jan. 4, 2011, pp. 1-5.

PCT/US2017/050784, International Search Report, dated Dec. 6, 2017, 16 pages.

* cited by examiner

TEST CASE GENERATOR BUILT INTO DATA-INTEGRATION WORKFLOW EDITOR

CROSS-REFERENCE TO RELATED APPLICATIONS

This application claims benefit of U.S. Provisional Patent Application No. 62/395,179, entitled "Test Case Generator Built into Data-Integration Workflow Editor," filed Sep. 15, 2016; and U.S. Provisional Patent Application No. 62/402, 880, entitled "Test Case Generator Built into Data-Integration Workflow Editor," filed Sep. 30, 2016, both of which are assigned to the assignee hereof and the contents of which are hereby incorporated by reference.

BACKGROUND

Field

The present disclosure generally relates to generating unit tests for elements of a data-integration workflow. More specifically, the present disclosure provides techniques for a data-integration workflow editor to generate code to test user-selected program modules within a user-selected software framework.

Related Art

Technology for gathering and storing data has greatly improved in recent decades. In particular, data collection rates, data access speeds, and data storage capacities have all advanced considerably. In addition, computer processor speeds have also increased by several orders of magnitude and large numbers of computing resources have become readily available through the cloud. As a result, large-scale data analysis that would have been impractical a few decades ago is now possible.

Many modern businesses, universities, governments, and other entities collect data for accounting, research, intelligence, marketing, inventory, quality control, transactions, and other purposes. The term "big data" has been coined to refer to the large amounts of data (e.g., terabytes) that such an entity may possess. This big data can be statistically analyzed to determine trends and can be used to create useful predictive models (e.g., machine-learning models). An entity can use such analyses and models to inform decision-making and to identify trends, problems, and potential opportunities.

Often, the big data an entity possesses is distributed across many different data stores. Different data stores, in turn, may contain different types of data stored in different formats. As a result, data may have to be extracted from different locations, reformatted, combined, and loaded into a single data repository so that statistical analyses can be performed and predictive models can be created. This process is often referred to as extract, transform, and load (ETL).

DETAILED DESCRIPTION

Figure 1:
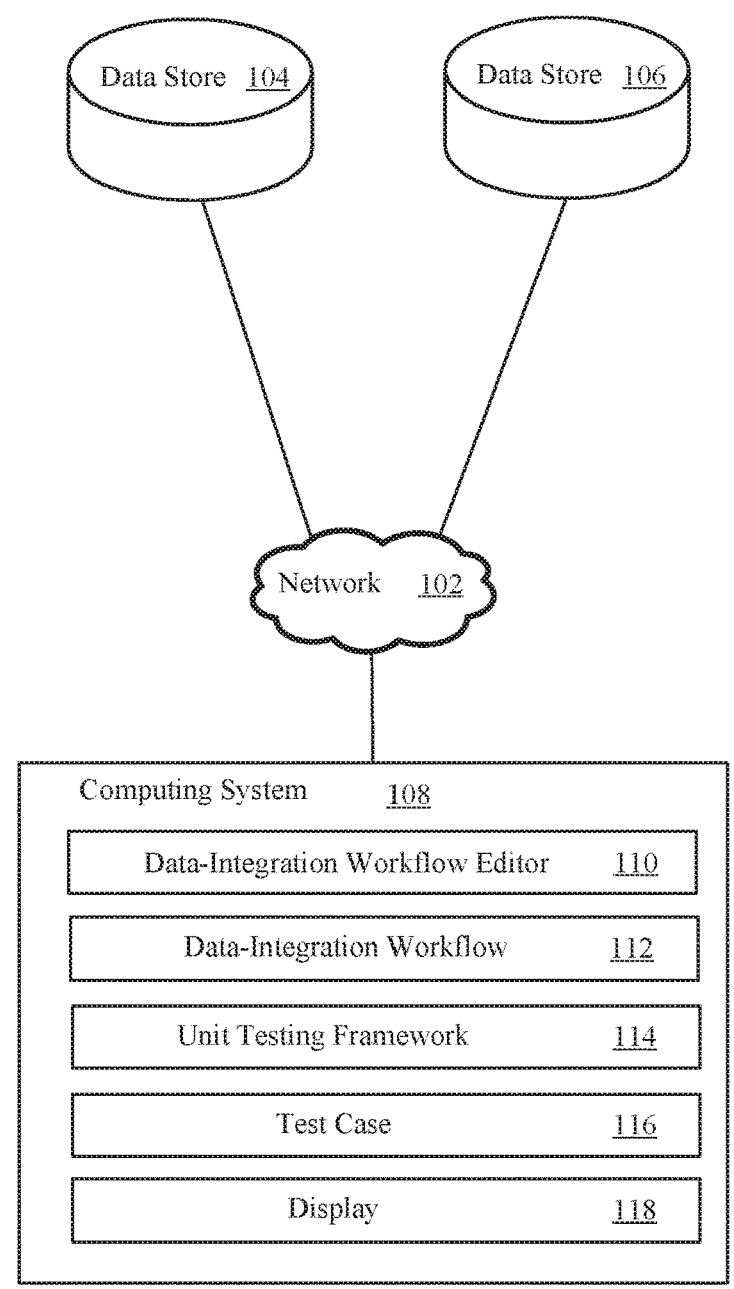
FIG. 1 illustrates an example computing environment that may be used to apply techniques of the present disclosure, according to one embodiment.

Embodiments described herein describe techniques for generating a unit test case for a component of a data transformation workflow. A data-integration workflow editor displays a graphical model of the data transformation workflow to a user. The user selects at least one icon of the graphical model that represents a transformation module within data transformation workflow. The user selects an option to create a test case for the transformation module. The user also requests that the test case be compatible with a specified software framework. The data-integration workflow editor identifies input paths to the transformation module and an output path from the transformation module in the data transformation workflow. A code generator creates a test case for the transformation module. The test case can be executed using the software framework.

When executed, the test case executes the transformation module using test input data (e.g., provided by the user). The test case then compares actual output data from the transformation module to target output data (e.g., provided by the user). If the actual output data matches the target output data, the test case indicates the test succeeded. Otherwise, the test case indicates the test failed and may optionally provide additional details about the failure.

In order to manage software for ETL effectively, continuous integration can be used. The term "continuous integration" refers to a software development practice where computer programmers on a team integrate their work frequently and verify each integration by an automated build so that integration errors can be detected promptly.

A data-integration workflow for an ETL project may specify sources of input data, modules (e.g., of programming code) that process the input data, and destinations where module output is sent, as well as the relationships between the sources, the modules, and the destinations. The term "data transformation module" refers to a component of a data-integration workflow that receives input data from one or more input sources, performs at least one operation on the input data to produce output data, and sends the output data to a destination.

The programmers on a software development team working on an ETL project may change over time. Oftentimes, team members may be obliged to modify unfamiliar components of an existing data-integration workflow. The correct structure or operation of these unfamiliar components may not be obvious. Under such circumstances, a team member can inadvertently introduce errors into the computer code of these components. Some of these errors may go undetected until the ETL project delivers incorrect results in production. Unit testing allows developers to test expected behavior or known error states, but manually coding unit tests can be time consuming and complex.

Embodiments described herein provide techniques to generate a test case for a transformation module without requiring manual coding. The test case can be executed independently of the application that generated it. The test case can be executed without accessing data sources that provide input to the transformation module in the data-integration workflow. In addition, the test case can be executed without accessing destinations that receive output from the transformation module in the data-integration workflow. For these reasons, the test case is highly portable and is independent of data sources and destinations referenced in the data-integration workflow.

A test case can accurately simulate a variety of data sources and structures, thereby enabling a developer to test the transformation module virtually against dummy or mock input data sets without setting up or maintaining actual database systems for testing purposes. A developer can validate each change in a transformation module against the test case (e.g., by clicking on a button or selecting an option to run the test case automatically each time the transformation module is changed).

The test case can also be associated with a version of the data-integration workflow. If the intended functionality of the transformation module changes in later versions, a developer may determine that the test case is obsolete by observing that the test case is associated with a previous version.

FIG. 1 illustrates an example computing environment 100 that may be used to apply techniques of the present disclosure, according to one embodiment. A computing system 108, a data store 104, and a data store 106 are connected to a network 102. The data-integration workflow editor 110 displays a graphical model of the data-integration workflow 112 on the display 118.

A user selects at least one icon in the graphical model and requests that a test case using the unit testing framework 114 be created for a transformation module represented by the selected icon. The data-integration workflow editor 110 determines that the transformation module in the data-integration workflow 112 is configured to receive input from data store 104 and send output to data store 106. The data-integration workflow editor 110 then generates the test case 116.

The test case 116, when run, executes the transformation module on test input. The test case 116 can receive the test input from a source other than the data store 104, yet provide the test input to the transformation module in way that mimics the data store 104. As a result, the data store 104 does not have to be accessed when the test case 116 is executed. Similarly, the test case 116 can receive output from the transformation module in a way that mimics the data store 106. As a result, the data store 106 does not have to be accessed when the test case 116 is executed.

The test case 116 uses to the unit testing framework 114 and can be executed in a software framework designated by the user. The unit testing framework 114 (e.g., such as Junit) may be associated with a programming language (e.g., such as Java). The software framework may be Apache Hadoop or some other framework. The test case 116 can be executed using the software framework even if the data-integration workflow editor 110 is not running. Furthermore, the test case 116 is portable to other computing systems that can use the unit testing framework 114 and the software framework. In other words, the test case 116 is free of dependencies on the data-integration workflow editor 110.

The user can also designate that the test case is to be executed automatically using specified test input and specified target output each time the transformation module is changed. Using the test case in this manner allows software developers to verify that the transformation module still functions properly after changes are made.

Figure 2:
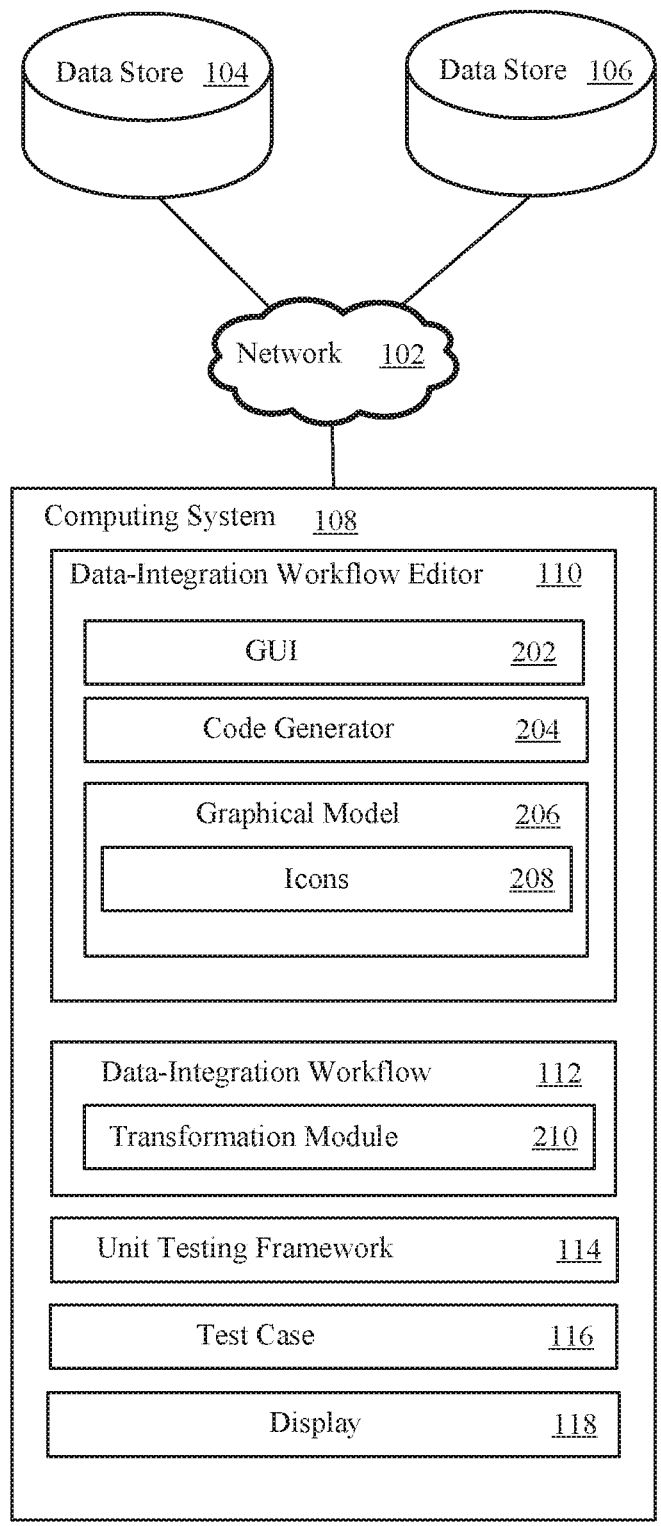
FIG. 2 illustrates a more detailed view of a computing system, according to one embodiment.

FIG. 2 illustrates a more detailed view of the computing system 108, according to one embodiment. The computing system 108, a data store 104, and a data store 106 are connected to a network 102. The data-integration workflow editor 110 includes a graphical user interface (GUI) 202, a code generator 204, and a graphical model 206 of the data-integration workflow 112. The graphical model 206 includes icons 208. The data-integration workflow editor 110 displays a graphical model 206 of the data-integration workflow 112 in the GUI 202 on the display 118.

A user can select one or more of the icons 208 in the graphical model 206 to designate a transformation module 210 of the data-integration workflow 112 for testing. The data-integration workflow editor 110 determines that the transformation module 210 is configured to receive input from data store 104 and send output to data store 106. The code generator 204 then generates the test case 116 using to the unit testing framework 114.

The test case 116, when run, executes the transformation module 210 on test input. The test case 116 can receive the test input from a source other than the data store 104, yet provide the test input to the transformation module in way that mimics the data store 104. As a result, the data store 104 does not have to be accessed when the test case 116 is executed. Similarly, the test case 116 can receive output from the transformation module in a way that mimics the data store 106. As a result, the data store 106 does not have to be accessed when the test case 116 is executed.

The test case 116 uses to the unit testing framework 114 and can be executed in a software framework designated by the user. The unit testing framework 114 may be associated with a programming language (e.g., such as Junit, which is associated with Java). For example, the software framework may be Apache Hadoop or the Spark framework. The test case 116 can be executed using the software framework even if the data-integration workflow editor 110 is not running. Furthermore, the test case 116 is portable to other computing systems that can use the unit testing framework 114 and the software framework. In other words, the test case 116 is free of dependencies on the data-integration workflow editor 110.

Figure 3:
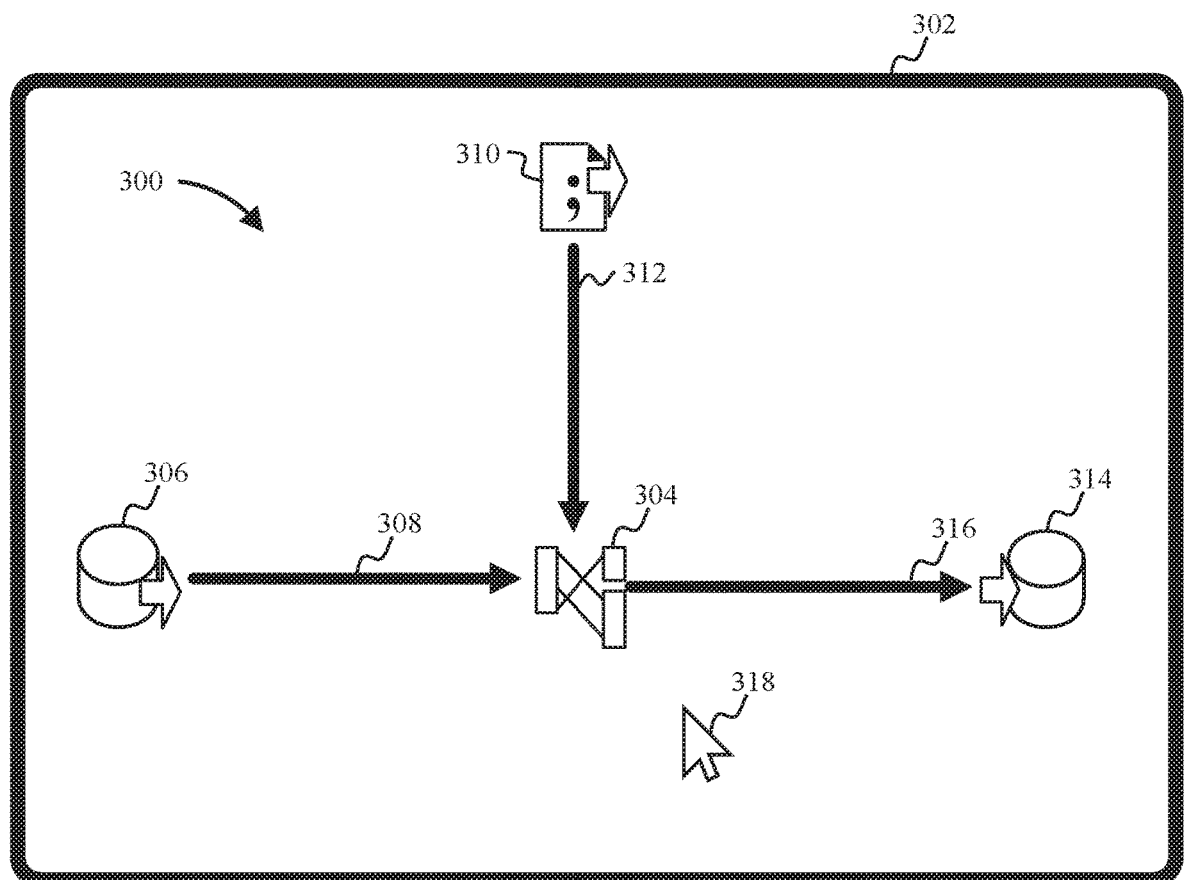
FIG. 3 illustrates a graphical model of a data-integration workflow as shown on a display, according to one embodiment.

FIG. 3 illustrates a graphical model 300 of a data-integration workflow as shown on a display 302, according to one embodiment. Icon 304 represents a transformation module. Icon 306 and icon 310 represent data sources from which the transformation module receives input in the data-integration workflow. For example, icon 306 may represent a database, while icon 310 may represent a flat file. Icon 314 represents a data source to which the transformation module provides output.

Arrow 312 is displayed in the graphical model 300 to indicate to a user that the transformation module represented by icon 304 receives input from the data source represented by icon 310. Similarly, arrow 308 is displayed in the graphical model 300 to indicate to the user that the transformation module represented by icon 304 also receives input from the data source represented by icon 306. Arrow 316 is displayed in the graphical model 300 to indicate to the user that the transformation module represented by icon 304 provides output to the data source represented by icon 314.

The user may select icon 304 using the cursor 318. Once the icon 304 is selected, a drop-down window can appear to provide an option to create a test case. The user can select the option and provide additional details for the test case, such as a version of the data-integration workflow to associate with the test and a software framework for the test case.

Based on these inputs from the user, a code generator creates a test case for the transformation module using a unit testing framework.

Code included in the test case is designed to receive test input data from sources other than the data repositories represented by icon 306 and icon 310. However, when the test case is executed, it provides the test input data to the transformation module being tested in a manner that still allows the transformation module to execute normally. For example, if the transformation module is designed to receive the input in a certain format or in a certain data structure, the test case includes code that can provide the test input data in the format or data structure. Similarly, if the transformation module provides output to the data repository represented by icon 314 in a certain format or data structure, the test case includes code to receive the output seamlessly in the format or data structure. The test case also includes code that compares output from the transformation module to target output.

Figure 4:
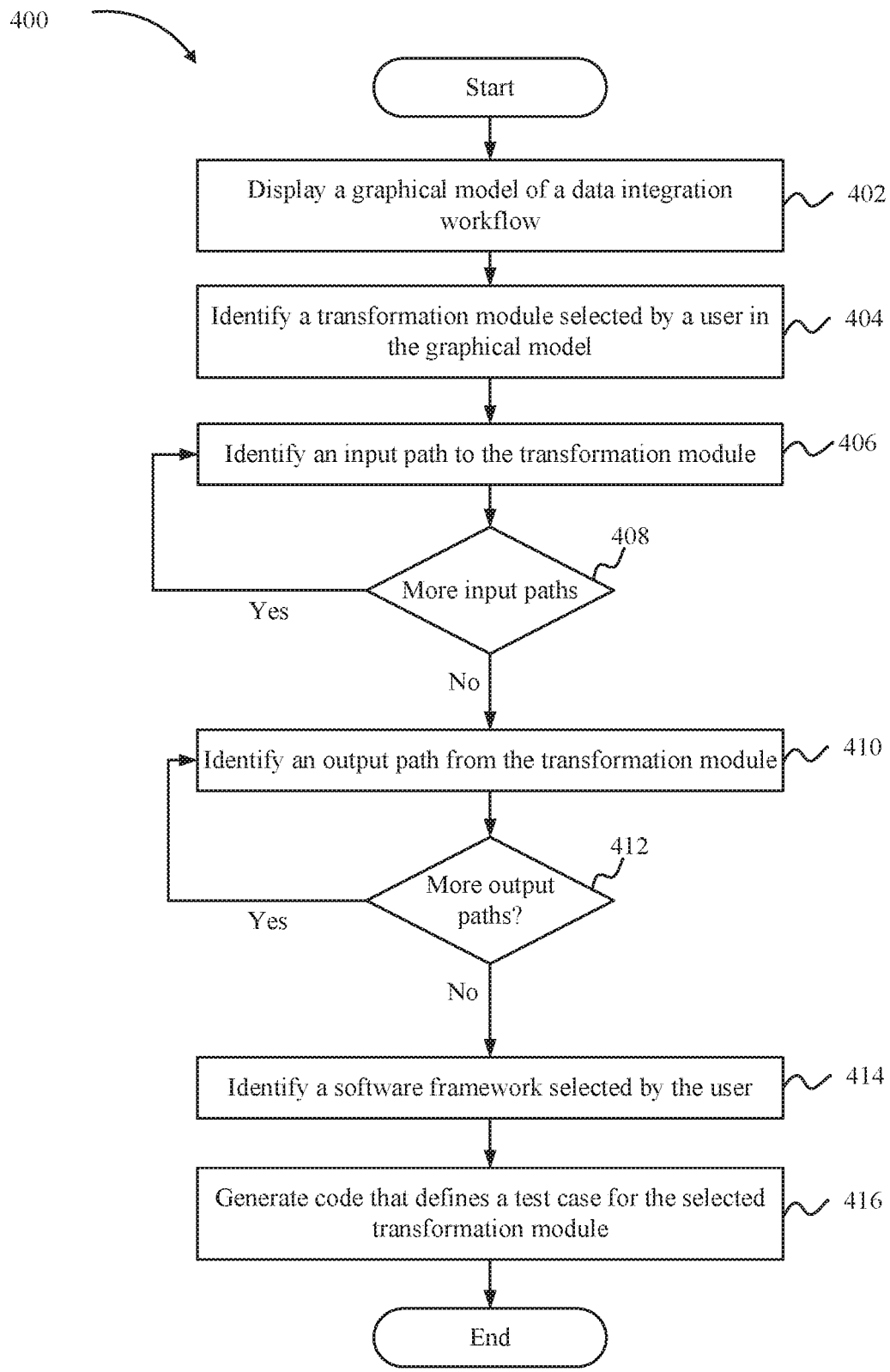
FIG. 4 is a flow chart illustrating a method for creating a test case for a transformation module of a data-integration workflow, according to one embodiment.

FIG. 4 is a flow chart illustrating a method 400 for creating a test case for a transformation module of a data-integration workflow, according to one embodiment. At step 402, a data-integration workflow editor displays a graphical model of a data-integration workflow in a graphical user interface.

At step 404, the data-integration workflow editor identifies a transformation module selected by a user in the graphical model. One or more icons in the graphical model may represent the transformation module.

At step 406, the data-integration workflow editor identifies an input path to the transformation module in the data-integration workflow. The input path may be represented by an arrow pointing toward an icon representing the transformation module in the graphical model. At step 408, the data-integration workflow editor determines whether there are additional input paths to the transformation module and repeats step 406 for each additional input path.

At step 410, the data-integration workflow editor identifies an output path from the transformation module in the data-integration workflow. The output path may be represented by an arrow pointing away from an icon representing the transformation module in the graphical model. At step 412, the data-integration workflow editor determines whether there are additional output paths from the transformation module and repeats step 410 for each additional output path.

At step 414, the data-integration workflow editor identifies a software framework selected by the user. At step 416, a code generator generates code that defines a test case for the selected transformation module. The test case includes code to receive the test input data for each input path identified in steps 406-408 from a user-specified data source rather than the actual data sources connected to the input paths in the data-integration workflow. The test case also includes code for providing the test input data to the transformation module in a manner that mimics the actual data sources when the test case executes the transformation module.

Furthermore, the test case includes code to receive target output data for each output path identified in steps 410-412. The test case also includes code to receive actual output data from the transformation module for each output path when the test case executes the transformation module as part of the testing process. The test case includes code to compare the target output data and the actual output data for each path. If there are any discrepancies between the target output data and the actual output data, the test case indicates the transformation module failed at least part of the test.

Figure 5:
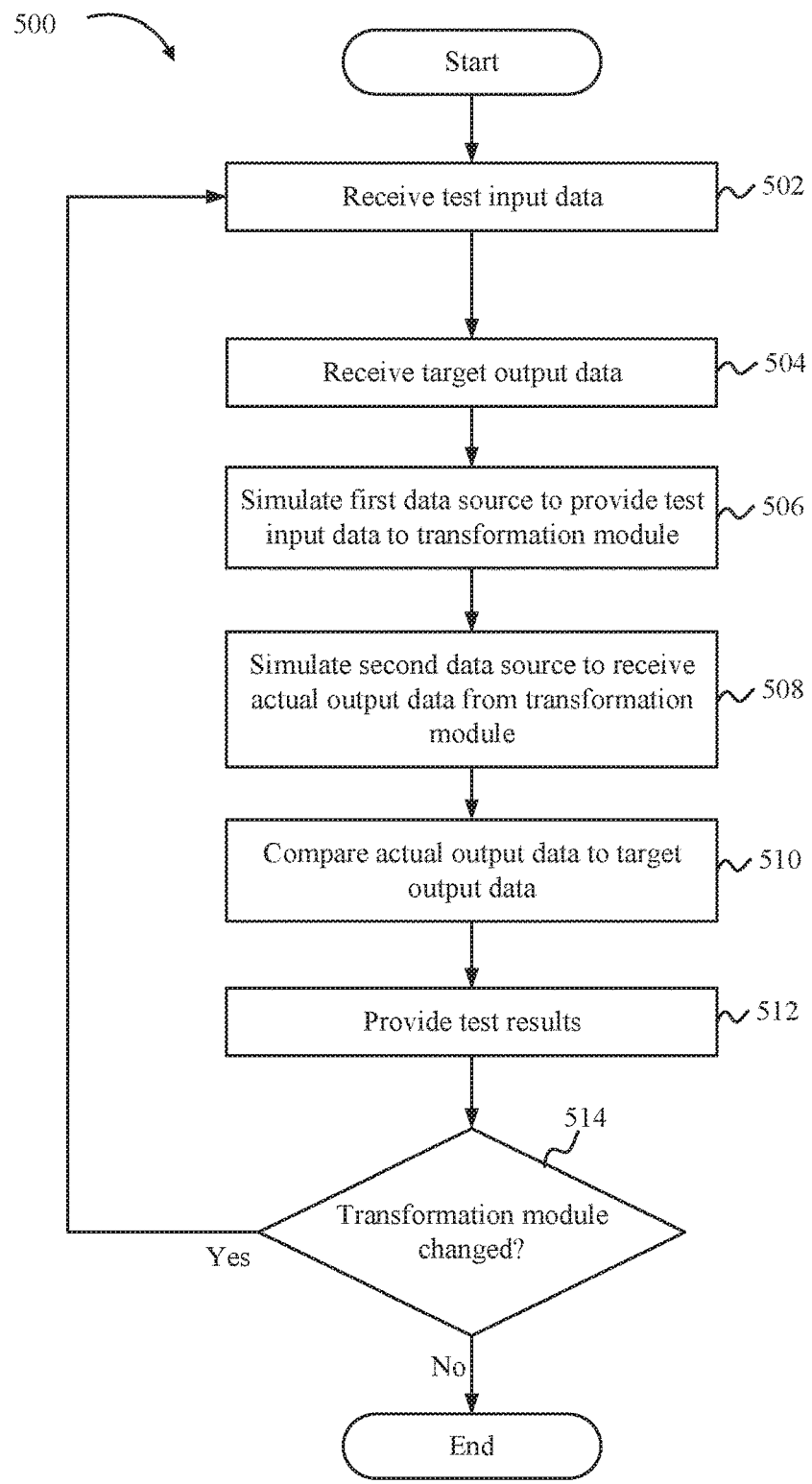
FIG. 5 is a flow chart illustrating a method for executing a test case for a transformation module of a data-integration workflow, according to one embodiment.

FIG. 5 is a flow chart illustrating a method 500 for executing a test case for a transformation module of a data-integration workflow, according to one embodiment. The test case may be a unit test that employs a unit testing framework and is compatible with a software framework.

At step 502, the test case receives test input data for the transformation module. The test input data may be received in a flat file or in some other format. At step 504, the test case receives target output data. Like the test input data, the target input data may be received in a flat file or in some other format. The target output data indicates what the transformation module is supposed to output when the transformation module is executed using the test input data as input.

At step 506, the test case simulates a first data source to provide the test input data to the transformation module (which the test case is executing as part of the test process). Within the data-integration workflow, the transformation module is configured to receive input from the first data source. However, when the transformation module is executed by the test case, the test case does not allow the transformation module to access the first data source. Instead, the test case simulates the first data source by interfacing with the transformation module in the same way that the first data source would if providing the test input data to the transformation module. This allows the test case to be independent from the first data source.

At step 508, the test case simulates a second data source to receive actual output data from the transformation module. Within the data-integration workflow, the transformation module is configured to send output to the first data source. However, when the transformation module is executed by the test case, the test case does not allow the transformation module to access the second data source. Instead, the test case simulates the second data source by interfacing with the transformation module in the same way that the second data source would if receiving the actual output data from the transformation module. This allows the test case to be independent from the second data source.

At step 510, the test case compares the actual output data to the target output data. At step 512, the test case provides test results based on the comparison. If the actual output data matches the output data, the test results indicate that the transformation module passed the test. Otherwise, the test results indicate that the transformation module failed the test. An indication of whether the test passed or failed can be associated with the test and stored.

At step 514, a data-integration workflow editor in which the test case was created determines whether the transformation module has been changed since the last time the test case was executed. If the transformation module has changed, steps 502-512 are repeated. Otherwise, the method 500 terminates. In one embodiment, step 514 is optional. A user may select an option in the data-integration workflow editor requesting that the test case be executed each time the transformation module is changed.

Figure 6:
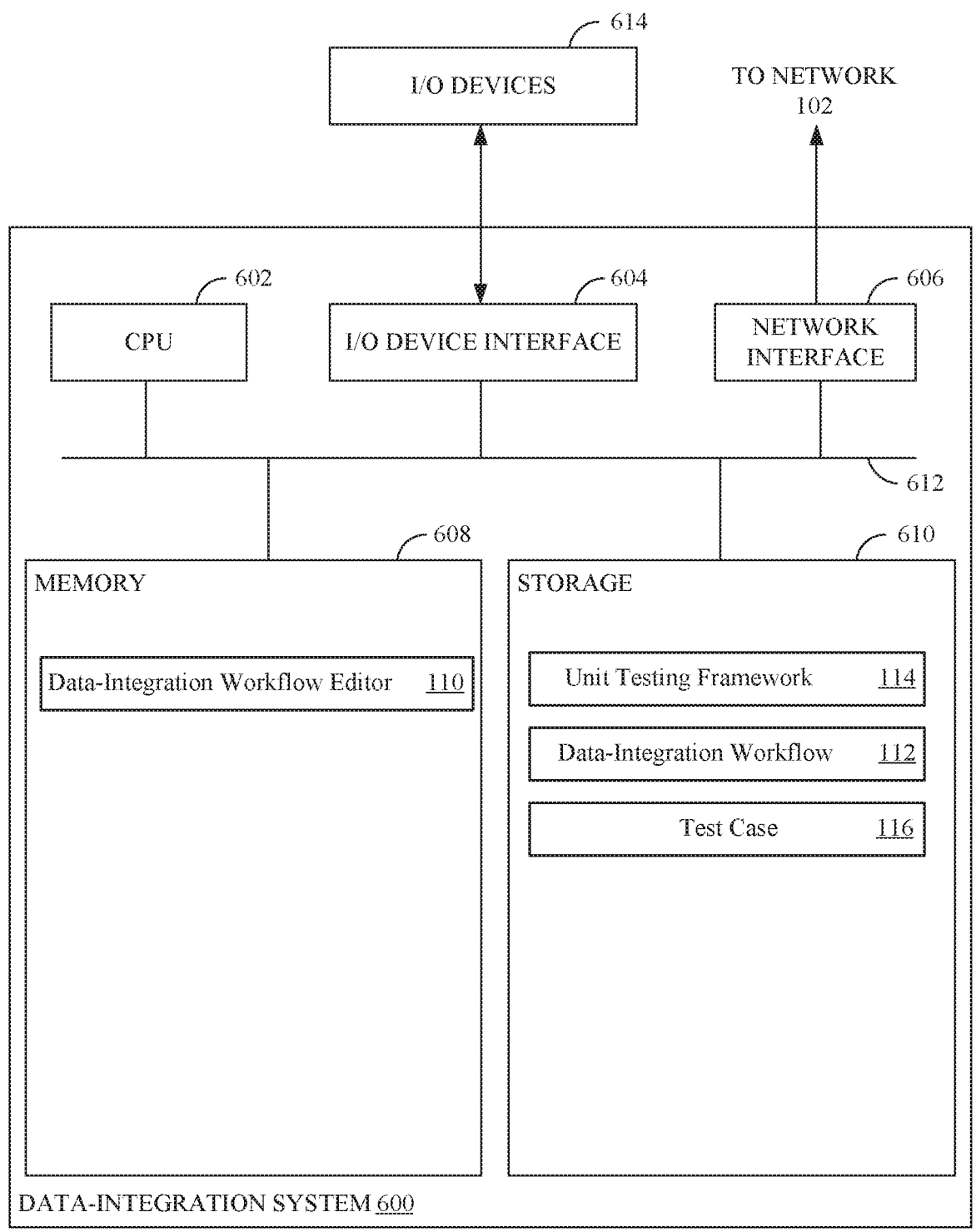
FIG. 6 illustrates an example data integration system that generates code for test cases, according to one embodiment.

FIG. 6 illustrates an example data-integration system 600 that generates code for test cases, according to one embodiment. As shown, the data-integration system 600 includes a central processing unit (CPU) 602, one or more input/output (I/O) device interfaces 604 which may allow for the connection of various I/O devices 614 (e.g., keyboards, displays, mouse devices, pen input, etc.) to the data-integration system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 606 represents random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes the data-integration workflow editor 110. The data-integration workflow editor 110 displays a graphical model of the data-integration workflow 112. A user may select one or more icons in the graphical model that represent a transformation module within the data-integration workflow 112. The user may also request that the data-integration workflow editor 110 generate code to define a unit test for the transformation model. In response, the data-integration workflow editor 110 creates the test case 116 based on the unit testing framework 114.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Additional examples of generating a unit test case for a component of a data transformation workflow are provided in the attached appendix.

While the foregoing is directed to embodiments of the present disclosure, other and further embodiments of the disclosure may be devised without departing from the basic scope thereof, and the scope thereof is determined by the claims that follow.

What is claimed is:

1. A method for generating a test case for a transformation module of a data-integration workflow, the method comprising:
    receiving a request to create the test case for the transformation module of the data-integration workflow that is compatible with a software framework;
    identifying a first network path from an input data source to the transformation module in the data-integration workflow;
    identifying a second network path from the transformation module to an output data source in the data-integration workflow;
    generating code that defines the test case for the transformation module;
    executing the test case in the software framework by:
        sending input data from a simulated input data source of the test case to the transformation module without accessing the input data source; and
        receiving output data at a simulated output data source of the test case from the transformation module without accessing the output data source;
    determining the transformation module has been changed to generate a changed module; and
    re-executing the test case in the software framework, wherein re-execution of the test case verifies functionality of the changed module.

2. The method of claim 1, further comprising:
    displaying a graphical model of the data-integration workflow in a graphical user interface (GUI), wherein at least one icon of the graphical model represents the transformation module; and
    receiving the request via the graphical user interface, wherein selection of the at least one icon identifies the transformation module.

3. The method of claim 1, further comprising:
    receiving test input data for the test case; and
    receiving target output data for the test case, wherein executing the test case comprises:
        executing the transformation module using the test input data,
        receiving the actual output data from the transformation module, and
        comparing the actual output data to the target output data.

4. The method of claim 3, further comprising:
    determining, based on the comparison of the actual output data to the target output data, whether the transformation module passed or failed a test defined by the test case, the test input data, and the target output data; and
    storing an indication of the determination.

5. The method of claim 3, wherein executing the test case includes simulating the input data source to provide the test input data to the transformation module.

6. The method of claim 1, wherein the test case is associated with a version of the data-integration workflow.

7. A non-transitory computer-readable storage medium containing instructions that, when executed by one or more processors, perform an operation for generating a test case for a transformation module of a data-integration workflow, the operation comprising:
    receiving a request to create the test case for the transformation module of the data-integration workflow that is compatible with a software framework;
    identifying a first network path from an input data source to the transformation module in the data-integration workflow;
    identifying a second network path from the transformation module to an output data source in the data-integration workflow;
    generating code that defines the test case for the transformation module;
    executing the test case in the software framework by:
        sending input data from a simulated input data source of the test case to the transformation module without accessing the input data source; and
        receiving output data at a simulated output data source of the test case from the transformation module without accessing the output data source;
    determining the transformation module has been changed to generate a changed module; and
    re-executing the test case in the software framework, wherein re-execution of the test case verifies functionality of the changed module.

8. The non-transitory computer-readable storage medium of claim 7, wherein the operation further comprises:
    displaying a graphical model of the data-integration workflow in a graphical user interface (GUI), wherein at least one icon of the graphical model represents the transformation module; and receiving the request via the graphical user interface, wherein selection of the at least one icon identifies the transformation module.

9. The non-transitory computer-readable storage medium of claim 7, wherein the operation further comprises:
receiving test input data for the test case; and
receiving target output data for the test case; and, wherein executing the test case comprises:
execurting the transformation module using the test input data,
receiving the actual output data from the transformation module, and
comparing the actual output data to the target output data.

10. The non-transitory computer-readable storage medium of claim 9, wherein the operation further comprises:
determining, based on the comparison of the actual output data to the target output data, whether the transformation module passed or failed a test defined by the test case, the test input data, and the target output data; and
storing an indication of the determination.

11. The non-transitory computer-readable storage medium of claim 9, wherein executing the test case includes simulating the input data source to provide the test input data to the transformation module.

12. The non-transitory computer-readable storage medium of claim 7, wherein the test case is associated with a version of the data-integration workflow.

13. A system for generating a test case for a transformation module of a data-integration workflow, comprising:
one or more processors; and
a memory storing one or more applications that, when executed on the one or more processors, perform an operation, the operation comprising:
receiving a request to create the test case for the transformation module of the data-integration workflow that is compatible with a software framework;
identifying a first network path from an input data source to the transformation module in the data-integration workflow;
identifying a second network path from the transformation module to an output data source in the data-integration workflow;
generating code that defines the test case for the transformation module;
executing the test case in the software framework by:
sending input data from a simulated input data source of the test case to the transformation module without accessing the input data source; and
receiving output data at a simulated output data source of the test case from the transformation module without accessing the output data source;
determining the transformation module has been changed to generate a changed module; and
re-executing the test case in the software framework, wherein re-execution of the test case verifies functionality of the changed module.

14. The system of claim 13, wherein the operation further comprises:
displaying a graphical model of the data-integration workflow in a graphical user interface (GUI), wherein at least one icon of the graphical model represents the transformation module; and
receiving the request via the graphical user interface, wherein selection of the at least one icon identifies the transformation module.

15. The system of claim 13, wherein the operation further comprises:
receiving test input data for the test case; and
receiving target output data for the test case, wherein executing the test case comprises:
executing the transformation module using the test input data,
receiving the actual output data from the transformation module, and
comparing the actual output data to the target output data.

16. The system of claim 15, wherein the operation further comprises:
determining, based on the comparison of the actual output data to the target output data, whether the transformation module passed or failed a test defined by the test case, the test input data, and the target output data; and
storing an indication of the determination.

17. The system of claim 15, wherein executing the test case includes simulating the input data source to provide the test input data to the transformation module.

* * * * *